United States Patent [19]

Ikebe et al.

[11] Patent Number: 5,220,899

[45] Date of Patent: Jun. 22, 1993

[54] INTERNAL COMBUSTION ENGINE WITH AIR ASSIST FUEL INJECTION CONTROL SYSTEM

[75] Inventors: Hidehito Ikebe; Shusuke Akazaki, both of Saitama, Japan

[73] Assignee: Honda Giken Kogyo Kabushiki Kaisha, Tokyo, Japan

[21] Appl. No.: 938,924

[22] Filed: Aug. 31, 1992

[30] Foreign Application Priority Data

Aug. 29, 1991 [JP] Japan ................... 3-218238

[51] Int. Cl.$^5$ ............... F02M 23/10; F02M 35/10
[52] U.S. Cl. ................ 123/531; 123/90.16; 123/308
[58] Field of Search ............ 123/90.16, 306, 308, 123/432, 531, 533

[56] References Cited

U.S. PATENT DOCUMENTS

| | | | |
|---|---|---|---|
| 4,714,063 | 12/1987 | Oda et al. | 123/308 |
| 4,754,740 | 7/1988 | Emmenthal et al. | 123/533 |
| 4,794,901 | 1/1989 | Hong et al. | 123/533 |
| 5,085,189 | 2/1992 | Huang et al. | 123/533 |
| 5,095,859 | 3/1992 | Iwata et al. | 123/308 X |
| 5,121,716 | 6/1992 | Takahashi et al. | 123/531 |
| 5,150,692 | 9/1992 | Trombley et al. | 123/533 |
| 5,172,674 | 12/1992 | Horie et al. | 123/308 X |

*Primary Examiner*—Willis R. Wolfe
*Attorney, Agent, or Firm*—Lyon & Lyon

[57] ABSTRACT

An internal combustion engine of the type having a fuel injection valve provided with assist air supply device for finely atomizing fuel and disposed in an intermediate portion of the intake passage, and swirl control device for producing a swirl in the combustion chamber in accordance with an operational condition of the engine, which engine is capable of conducting a lean burn. The engine further includes a control unit for controlling the operation of the assist air supply device in accordance with the operational conditions of the engine including at least the temperature of the engine cooling water, the operational condition of the swirl control device, and the condition whether the engine is in the range of the lean burn to thereby improve the operaation of engine under various conditions.

4 Claims, 9 Drawing Sheets

INTERNAL COMBUSTION ENGINE WITH AIR ASSIST FUEL INJECTION CONTROL SYSTEM

BACKGROUND OF THE INVENTION

1. Field of the Invention

The field of the present invention is internal combustion engines of a type having a fuel injection valve provided with assist air supply means for finely atomizing fuel and disposed in an intermediate portion of an intake passage, and with swirl control means for producing a swirl in the combustion chamber in accordance with certain operational conditions of the engine, which engine is capable of conducting a lean burn.

2. Description of the Prior Art

There is a conventionally known engine in which the amount of the assist air is control led in accordance with the operational condition of the engine as described, for example in Japanese Utility Model Application Laid-Open No. 76558/89.

In such a prior art engine, when the air assisting is carried out in the condition where the swirl is produced in the combustion chamber in order to promote the lean burn, the assisting air hinders the production of the swirl and the lean burn cannot be achieved sufficiently. Also, in a non-swirl operational region in which the engine temperature is low, it is difficult to finely atomize the fuel since the intake air is reduced in velocity in the intake passage. For this reason, the fuel is likely to cling to an inner wall of the intake passage, leading to a deterioration in driveability. In such a case, if the air assisting is carried out, the fine atomization of the fuel will be promoted. Moreover, the limit of lean burn varies in accordance with the temperature of the engine. Accordingly, it has been found by the inventors that it is advantageous for the air assisting to be carried out in response to the temperature of the engine, the range of the swirl operation and the range of the lean burn, in order to obtain a suitable operation of the engine.

SUMMARY OF THE INVENTION

It is an object of the present invention to provide an internal combustion engine wherein the air assisting is controlled by taking in to account the temperature of the engine, the range of the swirl operation and the range of the lean burn, in order to obtain a suitable operation of the engine.

To achieve the above objects, according to a first aspect of the present invention, there is provided a device including control means for controlling the operation of the assist air supply means in accordance with the operational condition of the engine including at least the temperature of the engine, the operational condition of the swirl control means, and whether or not the engine is in a range of the lean burn. With this arrangement of the invention, a determination is made whether or not the air assisting should be conducted by taking into account the engine temperature, and also taking into account whether or not the engine is in a condition for the swirl operation, and whether or not the engine is in the range of the lean burn to thereby provide suitable operation of the engine.

In addition, according to a second aspect of the present invention, the control means controls the assist air supply means to conduct an air assisting when the engine temperature is low, irrespective of the operational condition of the swirl control means and whether or not the engine is in the range of the lean burn. With this arrangement of the invention, the air assisting is carried out whenever the engine temperature is low, irrespective of the operational condition of the swirl control means and whether or not the engine is in the range of the lean burn, so that the air assisting promotes the fine atomization of the fuel, which otherwise can not easily be finely atomized because of the low temperature to thereby improve driveability.

According to a third aspect of the present invention, the control means controls the assist air supply means to conduct an air assisting when the swirl control means is in a non-swirl state, irrespective of whether the engine temperature is low and whether or not the engine is in the range of the lean burn. With this arrangement of the invention, the air assisting is carried out whenever the swirl control means is in a non-swirl state, irrespective of a low engine temperature and whether or not the engine is in the range of the lean burn. Thus, the hindrance to the production of the swirl is avoided, thereby leading to an improvement in combustibility.

According to a fourth aspect of the present invention, the control means controls the assist air supply means to conduct the air assisting when the engine is not in the range of the lean burn, irrespective of whether the engine temperature is low and the operational condition of the swirl control means. With this arrangement of the invention, the air assisting is carried out in a condition in which the engine is out of the range of the lean burn, irrespective of a low engine temperature and the operational condition of the swirl control means, so that the assisting air promotes the fine atomization of the fuel even in a rich mixture. This leads to improvements in driveability and combustibility.

The above and other objects, features and advantages of the present invention will become apparent from a consideration of the following description of a preferred embodiment, taken in conjunction with the accompanying drawings.

BRIEF DESCRIPTION OF THE DRAWINGS

The drawings illustrate a preferred embodiment of the present invention, wherein.

DESCRIPTION OF THE PREFERRED EMBODIMENTS

The present invention will now be described by way of a preferred embodiment of the present invention in connection with the accompanying drawings.

Figure 1:
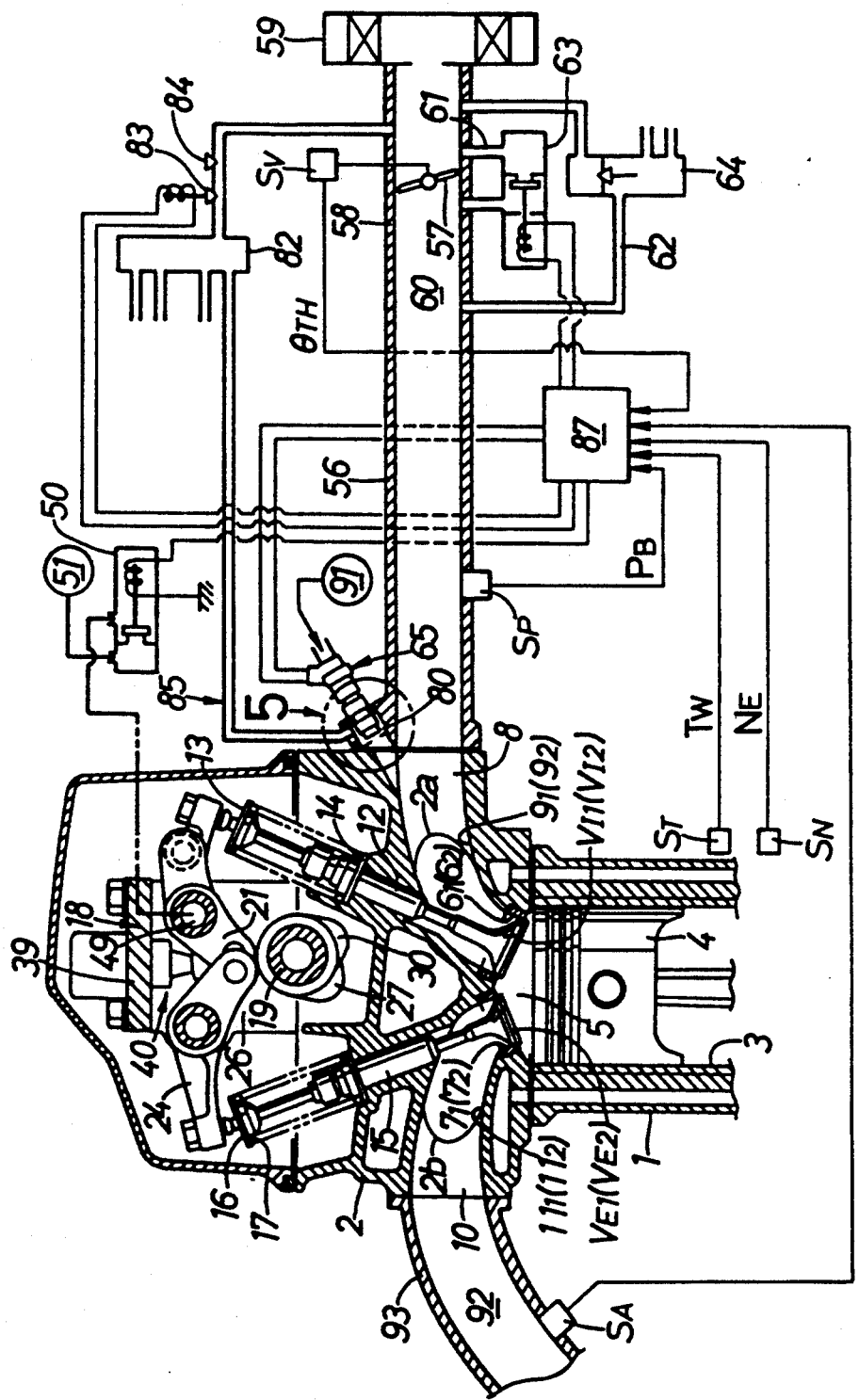
FIG. 1 is a diagrammatic view illustrating the engine intake and exhaust construction usable with this invention.
Figure 2:
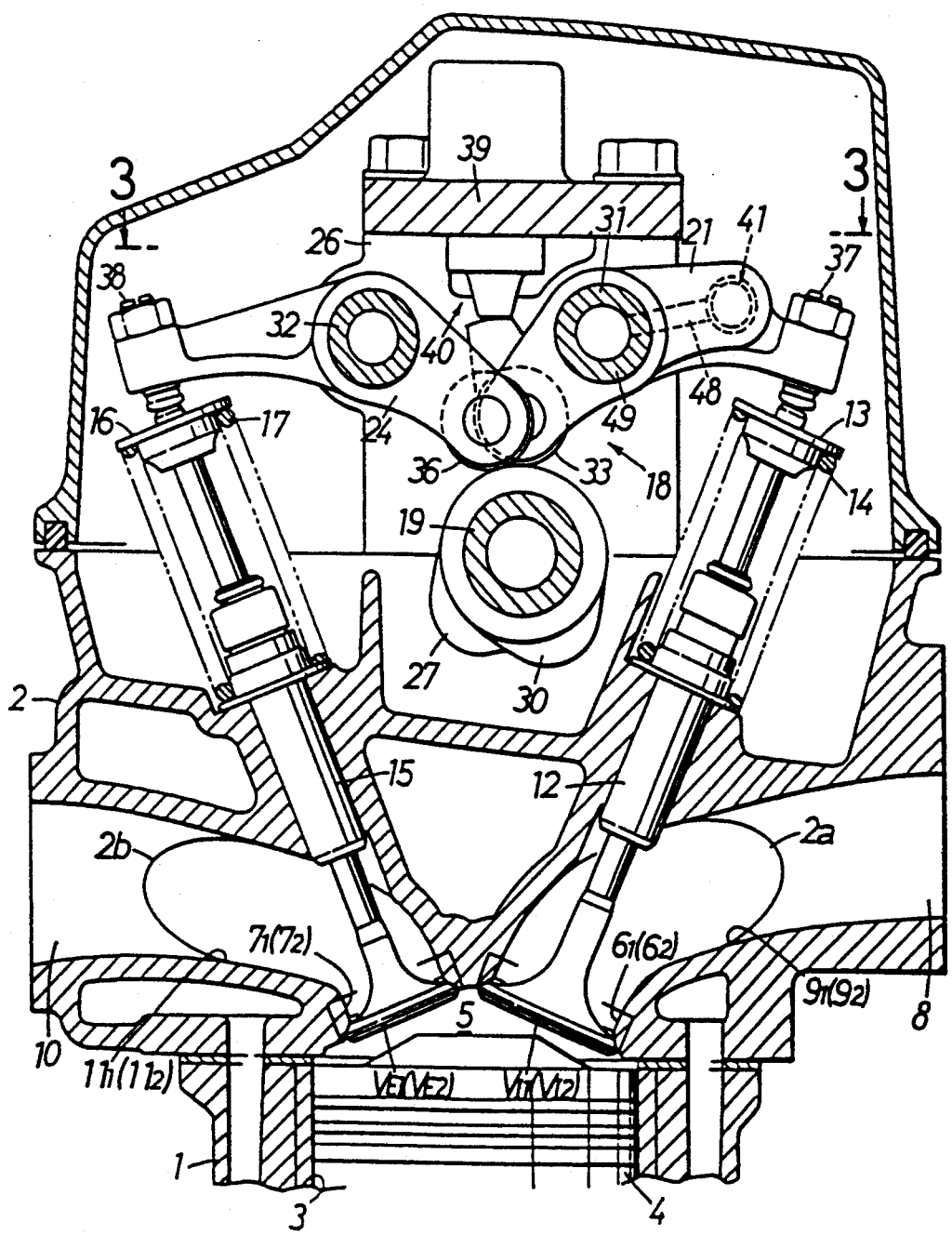
FIG. 2 is an enlarged sectional view of a portion of FIG. 1 illustrating a valve operating device.

Referring to FIGS. 1 and 2, a cylinder head 2 is mounted on an upper surface of a cylinder block 1 to form an essential portion of an engine body of an SOHC type multicylinder internal combustion engine. A piston 4 is slidably received in each of a plurality of cylinders 3 provided in the cylinder block 1. A combustion chamber 5 is defined between an upper surface of the piston 4 and the cylinder head 2.

A pair of intake valve bores $6_1$ and $6_2$ and a pair of exhaust valve bores $7_1$ and $7_2$ are provided in the cylinder head 2 and open into a ceiling surface of the combustion chamber 5. The intake valve bores $6_1$ and $6_2$ are connected to a single intake opening end 8 opened into one side of the cylinder head 2 through intake ports $9_1$ and $9_2$ which are provided on opposite sides of a partition wall 2a. The exhaust valve bores $7_1$ and $7_2$ are connected to a single exhaust opening end 10 opened into the other side of the cylinder head 2 through exhaust ports $11_1$ and $11_2$ which are provided on opposite sides of a partition wall 2b. The intake valve bores $6_1$ and $6_2$ are independently opened and closed by a pair of intake valves $V_{I1}$ and $V_{I2}$. The intake valves $V_{I1}$ and $V_{I2}$ are slidably received in a pair of cylindrical guides 12 disposed in the cylinder head 2. A retainer 13 is fixed to each of the intake valves $V_{I1}$ and $V_{I2}$ at an upper end thereof which projects from the corresponding cylindrical guide 12. A coil valve spring 14 is interposed between the retainer 13 and the cylinder head 2 so as to surround the corresponding intake valves $V_{I1}$ and $V_{I2}$. The springs 14 bias the corresponding intake valves $V_{I1}$ and $V_{I2}$ upwardly, namely in a closing direction thereof. The exhaust valve bores $7_1$ and $7_2$ are independently opened and closed by a pair of exhaust valves $V_{E1}$ and $V_{E2}$. The exhaust valves $V_{E1}$ and $V_{E2}$ are slidably received in a pair of cylindrical guides 15 disposed in the cylinder head 2. A retainer 16 is fixed to each of the exhaust valves $V_{E1}$ and $V_{E2}$ at an upper end thereof which projects from the corresponding cylindrical guide 15. A coil valve spring 17 is interposed between the retainer 16 and the cylinder head 2 so as to surround the corresponding exhaust valves $V_{E1}$ and $V_{E2}$. The springs 17 bias the corresponding exhaust valves $V_{E1}$ and $V_{E2}$ upwardly, namely in a closing direction thereof.

Figure 3:
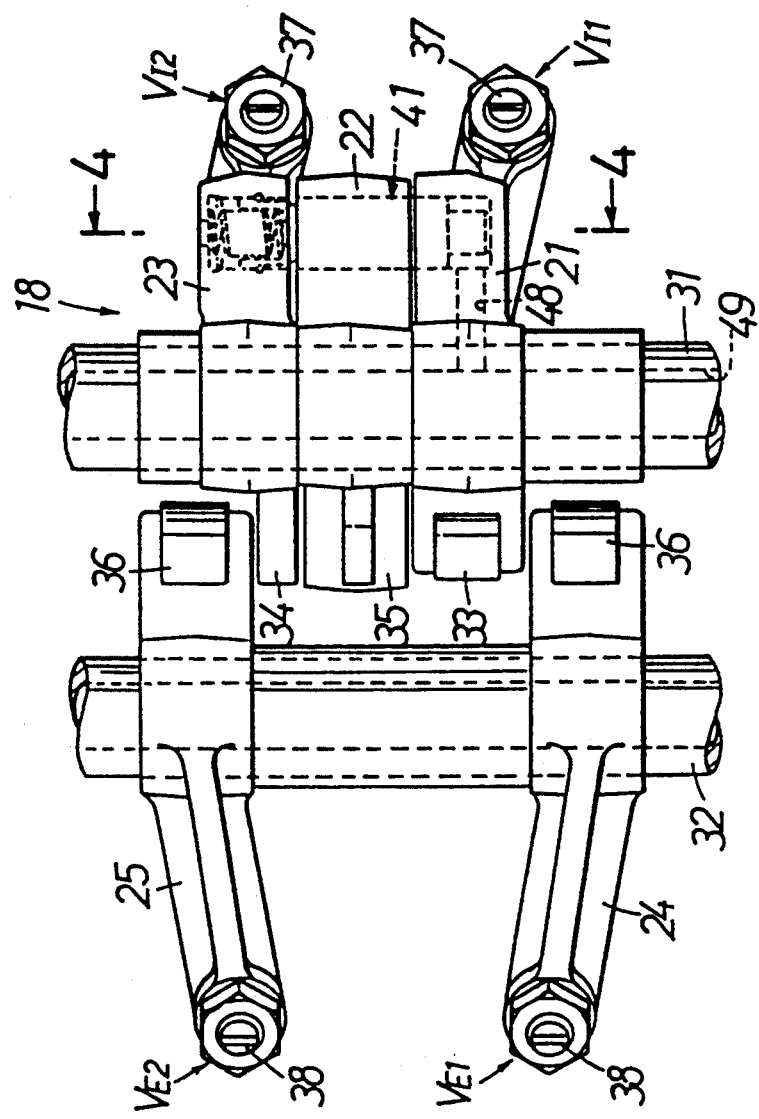
FIG. 3 is a plan view taken along a line 3—3 in FIG. 2.
Figure 4:
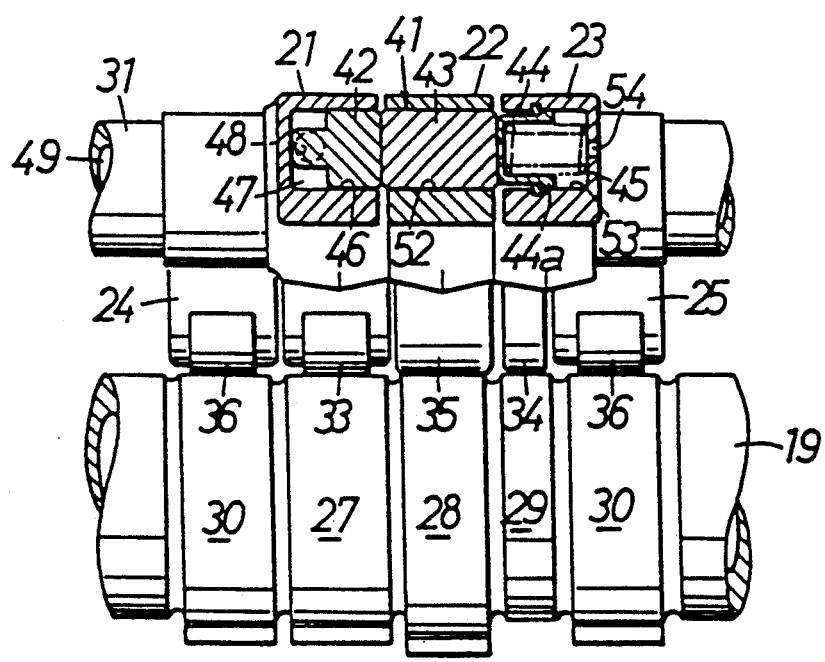
FIG. 4 is an enlarged sectional view taken along a line 4—4 in FIG. 3.

Referring also to FIGS. 3 and 4, a valve operating device 18, which functions as a swirl control means, is connected to the intake valves $V_{11}$ and $V_{12}$ and the exhaust valves $V_{E1}$ and $V_{E2}$. The valve operating device 18 comprises a single cam shaft 19 operatively connected to a crankshaft (not shown) with a reduction ratio of ½, first, second and third intake rocker arms 21, 22 and 23 for converting the rotating motion of the cam shaft 19 into the opening and closing motions of the intake valves $V_{I1}$ and $V_{I2}$ and first and second exhaust rocker arms 24 and 25 for converting the rotating motion of the cam shaft 19 into the opening and closing motions of the exhaust valves $V_{E1}$ and $V_{E2}$.

A plurality of holders 26 are mounted on the cylinder head 2 on opposite sides of the cylinders 3 along an axis parallel to the crankshaft. The cam shaft 19 is rotatably supported by the cylinder head 2 and the holders 26 such that the axis of the shaft 19 extends perpendicular to the axis of each of the cylinders 3.

Referring specifically to FIG. 4, integrally provided on the cam shaft 19 are a first intake cam 27 having a shape corresponding to a low speed operation of the engine, a second intake cam 28 disposed adjacent to one side of the first intake cam 27 and formed in a shape corresponding to a high speed operation of the engine, a raised portion 29 adjacent to the other side of the second intake cam 28. In addition, exhaust cams 30 and 30 are provided on opposite sides of the cams 27, 28 and the raised portion 29. The raised portion 29 is basically formed to have an outer surface which is circular about the axis of the cam shaft 19 in order to bring the intake valve $V_{I1}$ into a substantially inoperative state in a range of low-load operation of the engine. However the raised portion 29 is provided with a small projection in a section corresponding to the lobe portion of each of the first and second intake cams 27 and 28 for opening the intake valve $V_{I1}$ a small amount during each revolution to avoid sticking. Moreover, the width of the raised portion 29 in a direction along the axis of the cam shaft 19 is relatively small because of the light loads imposed thereon.

As shown in FIG. 3, the first intake rocker arm 21 is operatively connected to one intake valve $V_{I1}$, while the third intake rocker arm 23 is operatively connected to the other intake valve $V_{I2}$. The second intake rocker arm 22 which can be free with respect to the intake valves $V_{I1}$ and $V_{I2}$ is disposed between the first and third intake rocker arms 21 and 23. An intake rocker shaft 31 is fixedly supported in the holders 26 at an upwardly obliqued position with respect to the cam shaft 19 such that the axis of the shaft 31 extends parallel to the cam shaft 19. The intake rocker arms 21 to 23 are pivotally mounted on the intake rocker shaft 31. The first and second exhaust rocker arms 24 and 25 are operatively connected individually to the exhaust valves $V_{E1}$ and $V_{E2}$, respectively. An exhaust rocker shaft 32 is fixedly supported in the holders 26 above and laterally of the cam shaft 19 and parallel to the intake rocker shaft 31. The exhaust rocker arms 24 and 25 are pivotally mounted on the exhaust rocker shaft 32.

A roller 33 is rotatably supported at one end of the first intake rocker arm 21 to be in sliding and rolling contact with the first intake cam 27. A sliding contact portion 34 is provided at one end of the third intake rocker arm 23 for sliding contact with the raised portion 29. The width of the sliding contact portion 34 is narrow so as to correspond to the raised portion 29. A cam slipper 35 is provided on the second intake rocker arm 22 for sliding contact with the second intake cam 28. Also, rollers 36 are rotatably supported at one end of each of the exhaust rocker arms 24 and 25 to be in sliding and rolling contact with the exhaust cams 30 and 30, respectively, which are provided on the cam shaft 19.

Tappet screws 37 are threadedly mounted at the other ends of the first and third intake rocker arms 21 and 23 to abut against the upper ends of the intake valves $V_{I1}$ and $V_{I2}$, respectively, for adjusting the lash or space between the screws and the valves. The intake valves $V_{I1}$ and $V_{I2}$ are opened and closed in accordance with the pivoting movements of the first and third intake rocker arms 21 and 23. Tappet screws 38 are threadedly mounted at the other ends of the exhaust rocker arms 24 and 25 to abut against the upper ends of the exhaust valves $V_{E1}$ and $V_{E2}$, respectively, for lash adjusting. The exhaust valves $V_{E1}$ and $V_{E2}$ are opened and closed in accordance with the pivoting movements of the exhaust rocker arms 24 and 25.

Referring to FIGS. 1 and 2, a support plate 39 is mounted to extend between upper ends of the holders 26. A lost motion mechanism 40 is disposed on the support plate 39 for resiliently biasing the second intake rocker arm 22 into sliding contact with the second intake cam 28 on the cam shaft 19.

Referring again to FIG. 4, a connection switchover mechanism 41 is provided on the intake rocker arms 21 to 23 for switching over the connection and disconnection of the intake rocker arms 21 to 23 in accordance with the operational condition of the engine.

The connection switchover mechanism 41 comprises a connecting piston 42 capable of interconnecting the first and second intake rocker arms 21 and 22, a connecting pin 43 capable of interconnecting the second and third intake rocker arms 22 and 23, a restraining member 44 for restraining the movements of the connecting piston 42 and the connecting pin 43, and a return spring 45 for biasing the connecting piston 42, the connecting pin 43 and the restraining member 44 in a direction to release the connection between the rocker arms (leftwardly when viewed in FIG. 4).

A first bottomed guide hole 46 which is opened toward the second intake rocker arm 22 is provided in the first intake rocker arm 21 in parallel with the intake rocker shaft 31. The connecting piston 42 is slidably received in the first guide hole 46. A hydraulic pressure chamber 47 is defined between one end of the connecting piston 42 and the closed end of the first guide hole 46. A communication passage 48 is provided in the first intake rocker arm 21 to communicate with the hydraulic pressure chamber 47. An oil passage 49 is provided in the intake rocker shaft 31 to continuously communicate with the communication passage 48 and therefore with the hydraulic pressure chamber 47 despite the pivoting movements of the first intake rocker arm 21. The oil passage 49 is connected to a hydraulic pressure source 51 through a connection-switchover electromagnetic control valve 50, as shown in FIG. 1.

The second intake rocker arm 22 is provided with a guide bore 52 which corresponds to the first guide hole 46 and penetrates through the second intake rocker arm 22 in parallel with the intake rocker shaft 31. The connecting pin 43, with its one end abutting against the other end of the connecting pin 42, is slidably received in the guide bore 52.

The third intake rocker arm 23 is provided with a second bottomed guide hole 53 which corresponds to the guide bore 52 in parallel with the intake rocker shaft 31. This hole 53 opens toward the intake rocker arm 22. The cup-shaped cylindrical restraining member 44, abutting against the other end of the connecting piston 43, is slidably received in the second guide hole 53. The restraining member 44 is disposed with its open end directed toward the closed end of the second guide hole 53. A collar 44a projects radially outwardly at the open end of the member 44 to be in sliding contact with an inner surface of the second guide hole 53. The return spring 45 is compressed between the closed end of the second guide hole 53 and the restraining member 44. The connecting piston 42, the connecting pin 43 and the restraining member 44, which are in mutual abutment against one another, are biased toward the hydraulic pressure chamber 47 by the spring force of the return spring 45. An air and oil venting communication hole 54 is provided in the closed end of the second guide hole 53.

In the above described connection switchover mechanism 41, when the engine is in a low-load operation, the hydraulic pressure in the hydraulic pressure chamber 47 is released through the connection switchover electromagnetic control valve 50, whereby the abutting surfaces of the connecting piston 42 and the connecting pin 43 are in a position corresponding to a clearance between the first and second intake rocker arms 21 and 22 by the spring force of the return spring 45. In addition the abutting surfaces of the connecting pin 43 and the restraining member 44 are in a position between the second and third intake rocker arms 22 and 23. Therefore, the intake rocker arms 21 to 23 are in states in which they are angularly displaceable relative to one another. Thus, the first intake rocker arm 21 is pivoted in response to the sliding contact with the first intake cam 27 by rotation of the cam shaft 19, thereby causing the one intake valve $V_{I1}$ to be opened and closed with a timing and a lift amount depending upon the shape of the first intake cam 27. The third intake rocker arm 23 which is in sliding contact with the raised portion 29 is brought into a substantially inoperative state, which in turn brings the other intake valve $V_{I2}$ into a substantially inoperative state. However, if the intake valve $V_{I2}$ is maintained in a completely inoperative state, the intake valve $V_{I2}$ may stick on the valve seat, thereby causing an accumulation of the fuel at the valve. In order to prevent this disadvantage, the intake valve $V_{I2}$ is not brought into a completely inoperative state but rather is slightly operated in an opening direction, when the intake valve $V_{I1}$ is opened. Further, the second intake rocker arm 22 is pivoted in response to the sliding contact with the second intake cam 28, but such motion exerts no influence on the first and third intake rocker arms 21 and 23 under this disconnected condition. The exhaust valves $V_{E1}$ and $V_{E2}$ are opened and closed with the timing and lift amount depending upon the shape of the exhaust cams 30.

When the engine is in a high-load operation, the connection switchover electromagnetic control valve 50 is opened, so that a high hydraulic pressure is applied to the hydraulic pressure chamber 47. This causes the connecting piston 42 to be moved in a direction to increase the volume of the hydraulic pressure chamber 47 against the spring force of the return spring 45, while urging the connecting pin 43 to move outwardly (to the right in FIG. 4). When the axes of the first guide hole 46, the guide bore 52 and the second guide hole 53 are aligned with one another, that is, when the intake rocker arms 21 to 23 are brought into their mutually stationary states, the connecting piston 42 is urged into the guide bore 52 and, in response thereto, the connecting pin 43 is urged into the second guide hole 53. This provides the connection of the intake rocker arms 21 to 23, whereby. And the first and third intake rocker arms 21 and 23 pivot together with the second intake rocker arm 22 which is in sliding contact with the second intake cam 28, thereby causing the intake valves $V_{I1}$ and $V_{I2}$ to be opened and closed with the timing and lift amount depending upon the shape of the second intake cam 28. The exhaust rocker arms 24 and 25 cause the exhaust valves $V_{E1}$ and $V_{E2}$ to be opened and closed with the timing and lift amount depending upon the shape of the exhaust cams 30 as in the low-load operation.

Referring again to FIG. 1, an air cleaner 59 is connected to the intake opening end 8 of the engine through an intake manifold 56 and a throttle body 58 having a throttle valve 57. An intake passage 60 is provided in the intake manifold 56 and the throttle body 58 to extend from the air cleaner 59 to the intake opening end 8. A bypass passage 61 and a first idle passage 62 are connected in parallel with the intake passage 60, while bypassing the throttle valve 57. A bypass electromagnetic control valve 63 is provided in the bypass passage 61. A waxoperated valve 64 is provided in the first idle passage 62 and is adapted to be operated in accordance with the temperature of the engine body cooling water.

Figure 5:
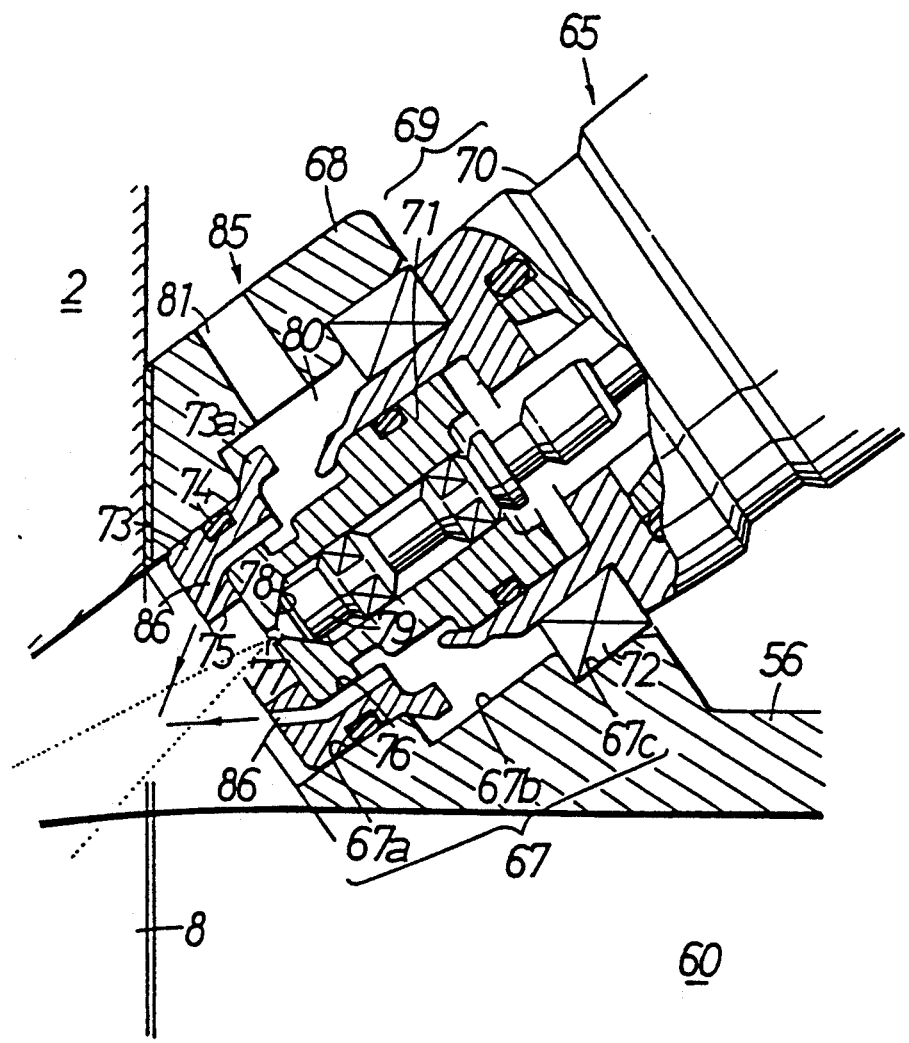
FIG. 5 is an enlarged sectional view of the encircled portion indicated by the bold-face numeral 5 in FIG. 1 illustrating the fuel injector.

Referring also to FIG. 5, the intake manifold 56 is provided at an end portion thereof close to the cylinder head 2 with a fuel injection valve 65 so as to direct the fuel from the intake opening end 8 toward the intake valve bores $6_1$ and $6_2$. More specifically, the intake manifold 56 is provided at an end portion thereof close to the cylinder head 2 with a mounting portion 68 which includes a mounting hole 67 having an axis obliquely extending downwardly toward the intake opening end 8. The fuel injection valve 65 is mounted in the mounting portion 68 with a tip end of the valve 65 projecting into the mounting hole 67.

The mounting hole 67 is comprised of a small diameter hole 67a, a medium diameter hole 67b and a large diameter hole 67c, which are connected to one another in sequence from the inner side of the mounting hole 67. A housing 69 for the fuel injection valve 65 is comprised of a drive housing 70 which contains an electromagnetic drive (not shown) and a basically cylindrical valve housing 71 secured at its rear end to the drive housing 70. The housing 69 is mounted to the mounting portion 68 with a sealing member 72 interposed between the drive housing 70 and a step between the medium diameter hole 67b and the large diameter hole 67c of the mounting hole 67. The valve housing 71 projects into the mounting hole 67.

A receiving member 73 is fitted in the small diameter posed between the member 73 and the hole 67a. The receiving member 73 is basically formed into a disk-like configuration, and is provided at its rear end with an engagement collar 73a which engages a step between the small diameter hole 67a and the medium diameter hole 67b. In a central portion of the receiving member 73, there is provided a fore-side through hole 75 and a fitting hole 76 having a larger diameter than that of the through hole 75. The through hole 75 and the fitting hole 76 are coaxially disposed and connected. The tip end of the valve housing 71 of the injection valve 65 is fitted into the fitting hole 76 so that it is received on a step between the through hole 75 and the fitting hole 76.

A fuel ejection port 77 and a tapered valve seat 78 connected to the fuel ejection port 77 are coaxially provided in a central portion of the tip end of the valve housing 71. A valve member 79 is disposed within the valve housing 71 for axial movement and is capable of seating on the valve seat 78. The valve member 79 is adapted to be driven axially by the electromagnetic drive contained in the drive housing 70 between a position in which the valve member 79 sits on the valve seat 78 to close the fuel ejection port 77 and a position in which the valve member 79 moves away from the valve seat 78 to open the fuel ejection port 77. When the valve member 79 is moved away from the valve seat 78, fuel from a fuel supply source 91 (see FIG. 1) is ejected forwardly from the fuel ejection port 77 toward the intake opening end 8.

With the fuel injection valve 65 mounted on the mounting portion 68, an annular air chamber 80 is defined between an inner surface of the mounting portion 68 and the housing 69. A passage 81 is provided in the mounting portion 68 to lead to the air chamber 80. A pair of air assist ejection ports 86 and 86 are provided in the receiving member 73 on opposite sides of the fuel ejection port 77 in the fuel injection valve 65 so as to lead to the chamber 80.

Referring again to FIG. 1, the passage 81 is connected to an air header 82 which is common to All of the cylinders. The air header 82 is connected to the intake passage 60 at a location upstream of the throttle valve 57 through an electromagnetic airamount control valve 83 and an idle adjust screw 84.

The pair of air assist ejection ports 86, 86, the air chamber 80, the air header 82, the electromagnetic air-amount control valve 83 and the idle adjust screw 84 constitute an assist air supply means, generally designated 85. The amount of assist air supplied from the assist air supply means 85 can be varied by operation of the electromagnetic air-amount control valve 83.

An exhaust manifold 93 is connected to the exhaust opening end 10 in the cylinder head 2 and provides an exhaust passage 92 connected to the catalytic converter and silencer (both not shown).

The operation of the connection-switchover electromagnetic valve 50, the bypass electromagnetic control valve 63, the fuel injection valve 65, and the electromagnetic air-amount control valve 83 in the assist air supply means 85 are controlled by a control means 87 which includes a computer. The engine operating information supplied to the control means 87 are the intake pressure $P_S$ detected by an intake pressure sensor $S_P$, the cooling water temperature $T_W$ detected by an engine cooling water temperature sensor $S_T$, the engine revolution speed number $N_E$ detected by a revolution number sensor $S_N$, the value detected by an air-fuel ratio sensor $S_A$ for detecting an air-fuel ratio from the composition of the exhaust gas in the exhaust passage 92, and the value detected in a throttle sensor $S_V$ for detecting the opening degree $\theta_{TH}$ of the throttle valve 57.

The control means 87 controls the operation of the connection switchover mechanism 41 in the valve operating device 18. In a low-load operation of the engine, the intake valve $V_{l2}$ is maintained in its substantially inoperative state so as to substantially stop the air suction from the intake port $9_2$, thereby producing a swirl in the combustion chamber 5 by reason of all of the intake air entering through intake port $9_1$. In a highload operation of the engine, both the intake valves $V_{l1}$ and $V_{l2}$ are operated simultaneously and the same which eliminates the swirl operation. In addition, the control means 87 controls the operation of the electromagnetic air-amount control valve 83 to control the supply of assist air from the assist air supply means 85 in accordance with the operational condition of the engine.

Figure 6:
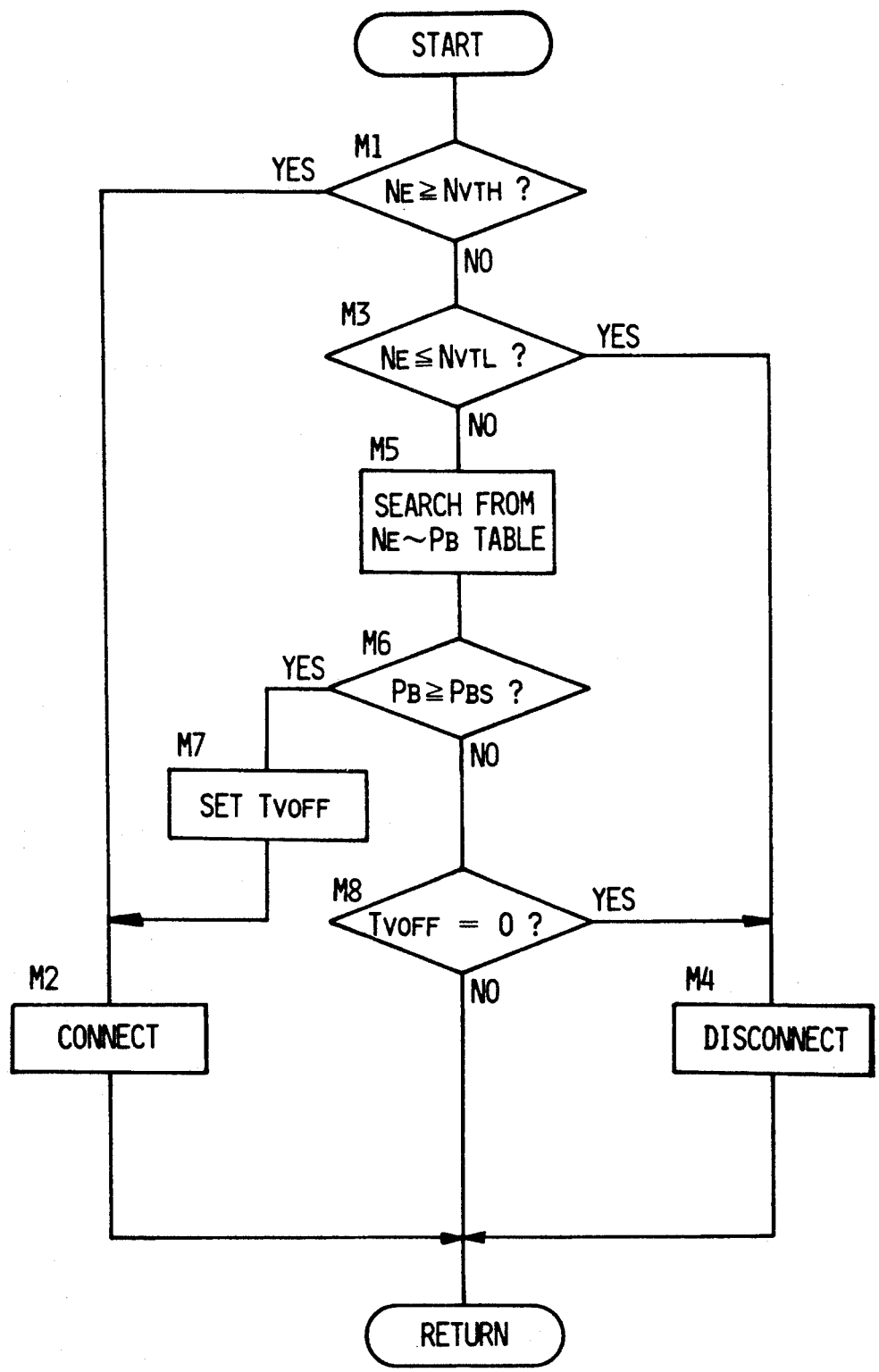
FIG. 6 is a flow chart illustrating a processing procedure for producing a swirl.

A processing procedure for controlling the operation of the connection switchover mechanism 41 in the valve operating device 18, that is, the operation of the connection-switchover electromagnetic control vale 50, is previously established in the control means 87, as shown in FIG. 6. At a firs step M1 in FIG. 6, it is decided whether or not the engine revolution number $N_E$ is equal to or more than a preset high revolution number $N_{VTH}$ ($N_E \geq N_{VTH}$). When it has been decided that $N_E \geq N_{VTH}$, the processing is advanced to a second step M2 at which the connectionswitchover electromagnetic control valve 50 is opened to operate the connection switchover mechanism 41 to provide the connection of the intake rocker arms 21 to 23. The intake valves $V_{I1}$ and $V_{I2}$ are opened and closed by the second intake cam 28 for high speed operation of the engine.

When it has been decided at the first step M1 and $N_E < N_{VTH}$, the procedure moves to a third step M3 where it is decided whether or not the engine revolution number $N_E$ is equal to or less than a preset low revolution number $N_{VTL}$ ($N_E \geq N_{VTL}$). When it has been decided that $N_E \geq N_{VTL}$, the connection-switchover electromagnetic control valve 50 is closed to cause the connection switchover mechanism 41 to release the connection of the intake rocker arms 21 to 23. The intake valve $V_{I1}$ is opened and closed by the first intake cam 27 while the intake valve $V_{I2}$ remains in its substantially inoperative state.

When is has been decided at the third step M3 that $N_E > N_{VTL}$, the processing is advanced to a fifth step M5. At the fifth step M5, a search is carried out at a previously established $N_E$-$P_B$ table. On the table, a preset intake pressure $P_{BS}$ is determined in the range in which the engine revolution number $N_E$ is equal to or more that the present low revolution number $N_{VTL}$ and is less than the present high revolution number $V_{VTH}$. When it has been decided at a next six step M6 that the actual intake pressure $P_B$ is equal to or more tan the present intake pressure $P_{BS}$ ($P_B \geq P_{BS}$) determined as a result of such search, the processing is advanced to a seventh step M7. However, if it has been decided that $P_B < P_{BS}$, the processing is advanced to an eighth step M8. It should be noted that the present intake pressure $P_{BS}$ is set to have a hysteresis.

At the seventh step M7, the countdown of a preset time, for example three seconds, is started in a timer $T_{VOFF}$ and the processing immediately advances to the second step M2 for causing connection of the connection switchover mechanism 41, whereupon the procedure returns to "start". If the procedure again proceeds through steps M1, M3 and M5 to step M6 and this time it is determined that $P_B < B_{BS}$, then the procedure moves to the eight step M8. At the eighth step M8, it is decided whether or not the timer $T_{VOFF}$ set at the seventh step M7 has reached "O", in other words, whether or not three seconds have elapsed after establishment of $P_B \geq P_{BS}$ in the range in which the engine revolution number $N_E$ is equal to or more than the present low revolution number $N_{VTL}$ and less than the present high revolution number $N_{VTH}$. Only when it has been decided that the predetermined time has elapsed, the processing is advanced to the fourth step M4 for disconnecting the connection switchover mechanism 41. If the three seconds have not elapsed, the processing again returns to start, thereby assuring that the connection switchover mechanism 41 remains connected for three seconds after being connected as a result of a determination of $P_B \geq P_{BS}$ in the sixth step M6.

The summary of the above-described processing procedure shown in FIG. 6 is as follows. In an operational region in which the intake pressure $P_B$ is equal to or more than the present intake pressure $P_{BS}$ corresponding to the engine revolution number $N_E$, the connection switchover mechanism 41 is in its connected state, so that the intake valves $V_{I1}$ and $V_{I2}$ are opened and closed by the second intake cam 28 to eliminate the swirl operational condition. In the other operation regions, the connection switchover mechanism 41 is in its disconnected state, and the intake valve $V_{I1}$ is opened and closed by the first intake cam 27, while the other intake valve $V_{I2}$ is in its substantially inoperative state to provide the swirl operational condition. Moreover, when the connection switchover mechanism 41 is shifted from the connected state to the disconnected state in a range of the engine revolution number $N_E$ equal to or more than the present low revolution number $N_{VTL}$ and less than the present high revolution number $N_{VTH}$, the operation of the connection switchover mechanism 41 to the disconnected state is prohibited until the predetermined time, for example three seconds, has elapsed. This avoids a hunting of the control that is liable to occur when the switching operation of the connection switchover mechanism 41 is decided on the basis of the intake pressure $P_B$, because the intake pressure $P_B$ is liable to vary (particularly during acceleration).

Figure 7:
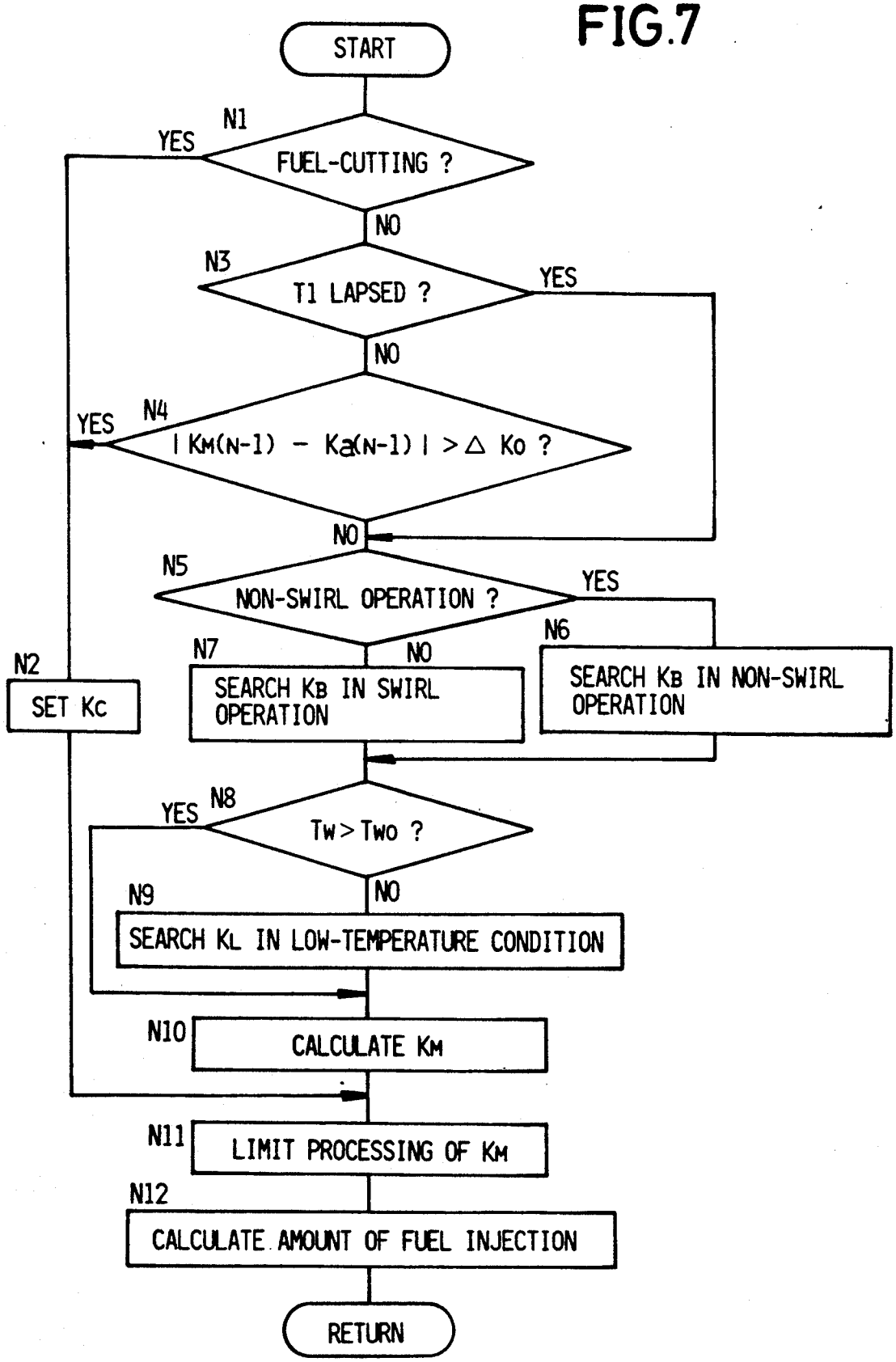
FIG. 7 is a flow chart illustrating a processing procedure for controlling the amount of the injection fuel.

A processing procedure for controlling the air-fuel ratio, that is, the amount of fuel injected from the fuel injection valve 65, is previously established in the control means 87, as shown in FIG. 7. At a first step N1 in FIG. 7, it is decided whether or not a cut-off of the fuel is being conducted by the control of the engine revolution number, the control of the vehicle speed, traction control or the like. When it has been decided that the cut-off of the fuel is being conducted, a give air-fuel ratio correspondence value $K_C$ is set at a second step N2 and thereafter, the processing is advanced to an eleventh step N11.

Herein, the above described "air-fuel ratio correspondence value $K_C$" and the "air-fuel ratio correspondence values $K_M$, $K_a$, $K_B$ and $K_L$", which will be described hereinafter, are set to 1.0 when the air-fuel ratio (the ratio of air to fuel A/F by weight) is of a theoretical value that will cause complete burning of the fuel, and are set to 0 (zero) when the air-fuel ratio is of the maximum value, namely when a lean fuel combustion condition is provided.

When it has been decided at the first step N1 that the cut-off of the fuel is not being conducted, the processing is advanced to a third step N3. At the third step N3, it is decided whether or not a predetermined time $T_1$ has elapsed after completion of the cut-off of the fuel. When the time $T_1$ has not elapsed yet, the processing is advanced to a fourth step N4. When it has been decided that the time $T_1$ has elapsed, the processing is advanced to a fifth step N5 bypassing the fourth step N4.

At the fourth step N4, it is decided whether or not a difference between an air-fuel ratio correspondence value $K_{M(n-1)}$ set at the last time and a last actual air-fuel ratio correspondence value $K_{a(n-1)}$ is larger than a predetermined value $\Delta K_O$. It should be noted that the actual air-fuel ratio correspondence value $K_a$ is determined on the basis of an air-fuel ratio detected by the air-fuel ratio sensor $S_A$. When it has been decided that such difference is larger than the predetermined value $\Delta k_O$, the processing is advanced to the second step N2 at which the given air-fuel ratio correspondence value $K_C$ is set. When it has been decided that the difference is not larger than the predetermined value $\Delta K_O$, the processing is advanced to the fifth step N5. Thus, if the relation ($|K_{M(n-1)} - K_{a(n-1)}| \leq \Delta K_0$) is not established during the cut-off of the fuel as well as until the time $T_1$ has elapsed after the completion of the cut-off of the fuel, the given air-fuel ratio correspondence value $K_C$ is set at the second step N2, because it is meaningless to control the airfuel ratio on the basis of a value detected by the air-fuel ratio sensor $S_A$.

At the fifth step N5, it is decided whether or not the engine is out of the range of the swirl operation, in other words, whether or not the connection switchover mechanism 41 is in its disconnected state. When it has been decided that the engine is out of the range of the swirl operation, an air-fuel ratio correspondence value $K_B$ is searched out from a previously established map at a sixth step N6. When it has been decided that the engine is in the range of the swirl operation, namely the connection switchover mechanism 41 is in its disconnected state, an air-fuel ratio correspondence value $K_B$ is searched out from a previously established map at a seventh step N7. It is to be noted that the map used to determine the air-fuel ratio when out of the range of the swirl operation of the engine is established in substantial correspondence to the theoretical airfuel ratio that will cause complete burning of the fuel. In addition, the map used to determine the air-fuel ratio in a range of the swirl operation of the engine is established to set the air-fuel ratio (A/F) to a large value in correspondence to a lean burn. In order to avoid a rapid variation in air-fuel ratio when the swirl operation and the non-swirl operation are changed over from each other, the air-fuel ratio is set to gradually be reduced, namely, the air-fuel ratio correspondence value $K_B$ is gradually increased in an area corresponding to a transition from a low-load to a high-load.

At an eighth step N8, it is decided whether or not the temperature $T_W$ of the engine cooling water is higher than a preset water temperature $T_{WO}$. When it has been decided that the temperature $T_W$ is higher than the preset water temperature $T_{WO}$, the processing is advanced to a tenth step N10 bypassing a ninth step N9. When it has been decided that the temperature $T_{WO}$, the airfuel ratio correspondence value $K_L$ is searched out in a ninth step N9 from a previously established map for use at a low temperature.

At the tenth step N10, a target air-fuel ratio correspondence value KM is calculated by multiplying an air-fuel ratio correspondence value $K_B$, set except for the lower temperature, by a correcting facto for a full opening of the throttle valve, a correcting factor depending upon the vehicle speed and the like. At the next eleventh step N1, it is decided whether or not the target air-fuel ratio correspondence value $K_M$ is in a given range. When it has been decided that the target air-fuel ratio correspondence value $k_M$ exceeds the give range, the maximum or minimum value previously set is produced as the target air-fuel ratio correspondence value $K_M$. At a twelfth step N12, a fuel injection amount is calculated by correcting the target air-fuel ratio correspondence value $K_M$ by a feedback factor or the like and thus, the amount of the fuel injected from the fuel injection valve 65 is determined.

In accordance with the control procedure shown in FIG. 7, in a low-load operation of the engine, the swirl operation is carried out with a lean burn, while in a high-load operation of the engine, the non-swirl operation is carried out with a burn based on the theoretical air-fuel ratio that will cause complete burning of the fuel.

Figure 8:
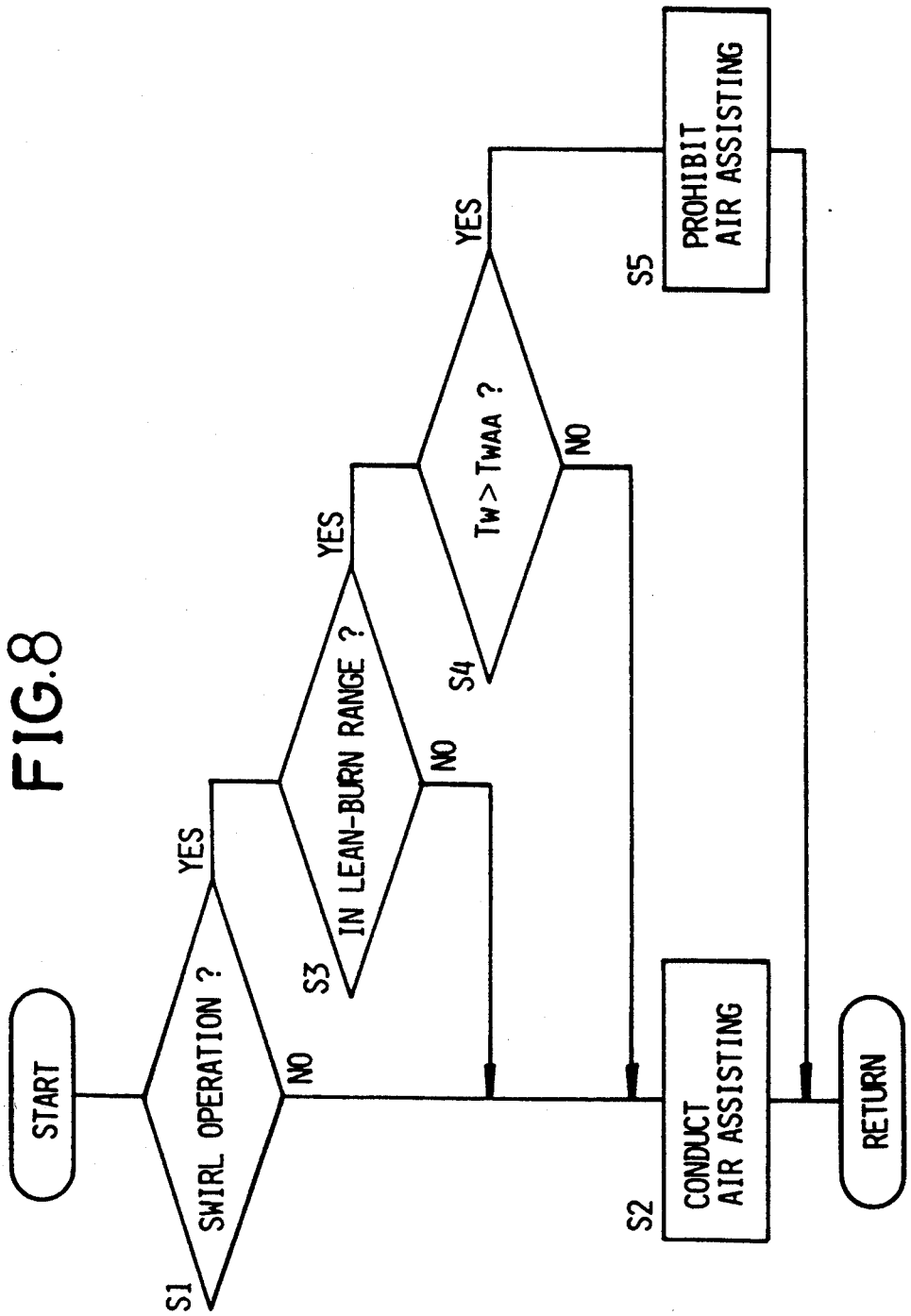
FIG. 8 is a flow chart illustrating a processing procedure for controlling the air assisting.

Further, a processing procedure for controlling the operation of the electromagnetic air-amount control valve 83, namely for controlling the operation of the assist air supply means 85 is established in the control means 87, as shown in FIG. 8. At a first step S1 in FIG. 8, it is decided whether or not the engine is in a swirl operation. When it has been decided that the engine is out of a swirl operation, the air assisting is carried out by the assist air supply means 85 at a second step S2. When it has been decided that the engine is in a swirl operation, the processing is advanced to a third step S3.

At the third step S3, it is decided whether or not the engine is in a range of the lean burn. When the engine is out of a range of the lean burn, namely the target air-fuel ratio correspondence value $K_M$ is equal to or more than "1.0" ($1.0 \leq K_M$), the processing is advanced to the second step S2 to carry out the air assisting. When the engine is in a range of the lean burn, namely the target air-fuel ratio correspondence value $K_M$ is less than "1.0" (KM < 1.0), the processing is advanced to a fourth step S4.

At the fourth step S4, it is decided whether or not the cooling water temperature $T_W$ exceeds a preset water temperature $T_{WAA}$. The preset water temperature $T_{WAA}$ is established on the basis of the variation of a limit of lean burn which exhibits a reduction in the air-fuel ratio as the cooling water temperature $T_W$ is reduced. The present water temperature $T_{WAA}$ is for example set at 20° C. When it has been decided that the water is in a low temperature state in which the relation $T_W \leq T_{WAA}$ is established, the air assisting is carried out at the second step S2. When the water is in a high temperature state in which the relation $T_{WAA} < T_W$ is established, the air assisting is stopped at a fifth step S5.

Theorization of the embodiment now will be described. In a non-swirl operational condition of the engine in which both the intake valves $V_{I1}$ and $V_{I2}$ are operated for opening and closing, an air flow is ejected from the upper and lower air assist ejection ports 86 and 86 toward a fuel jet from the fuel ejection port 77 in the fuel injection valve 65. The fuel particles in the fuel jet are finely atomized by collision with the air flow. Therefore, a fine atomization of the fuel can be promoted by the air assisting, even in a condition where it is difficult to atomize the fuel such as when the fuel mixture flows through both the intake ports 9₁ and 9₂ and a speed of the intake air is relatively slow. The prevents the fuel from accumulating the wall surfaces of the intake ports 9₁ and 9₂, leading to an improvement in driveability. This provides a smooth acceleration and a smooth deceleration.

In a non-lean burning operational region of the engine in which the one intake valve $V_{I2}$ is in a substantially inoperative state and the fuel mixture is supplied only from the intake valve bore 6₁ to produce a swirl in the combustion chamber 5, the fine atomization of the fuel in the rich fuel mixture is considered more important than the improved combustibility by a swirl in the combustion chamber 5. Therefore, the air assisting is imposed on the fuel jet from the fuel injection valve 65 so as to improve the fine atomization of the fuel for overcoming the effect of hindrance to the production of the swirl. This improves combustibility in the combustion chamber 5 and driveability.

Figure 9:
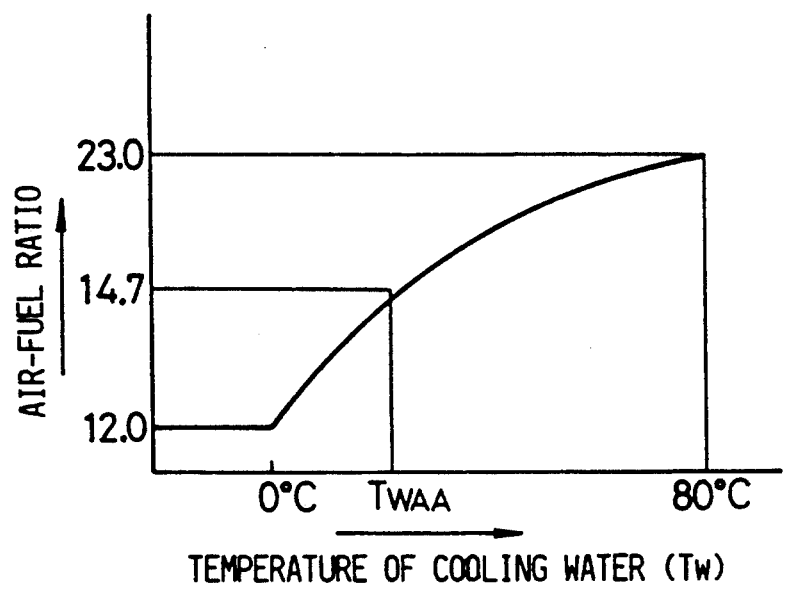
FIG. 9 is a graph illustrating the limits of lean burn.

In the range of the lean burn with a swirl operational condition, the air assisting is imposed on the fuel jet from the fuel injection valve 65 only when the cooling water temperature is low. More specifically, when the cooling water temperature is low, as shown in FIG. 9, a limit of lean burn is established in a lower region of the air-fuel ratio. This means that it is possible to maintain a lean burn even if the air assisting is carried out. Therefore, the fine atomization of the fuel, which tends to be hindered by a low temperature, is promoted by the air assisting, leading to improvements in combustibility and driveability.

Therefore, the air assisting is prohibited only when the cooling water temperature is high in a range of the swirl operation and in a range of the lean burn. More specifically, the air assisting is not required because the fine atomization of the fuel is relatively easy in the high temperature. Therefore, hindrance to a swirl is avoided, with a lean burn being maintained, thereby improving combustibility and reducing fuel consumption.

Moreover, a substantial stoppage of the air introduction from the one intake port 92 can be achieved by the one intake valve 92 being in a substantially inoperative state. Therefore, as compared with the conventional art in which a shutter valve or the like is disposed in the one intake port 92, the air assisting is more effectively utilized since the finely atomized fuel does not accumulate on such a shutter valve or the like.

What is claimed is:

1. An internal combustion engine having a fuel injection valve provided with assist air supply means for finely atomizing fuel and disposed in an intermediate portion of an intake passage, and swirl control means for producing a swirl in a combustion chamber in accordance with an operational condition of the engine, said engine being capable of conducting a lean burn, wherein said the engine further includes control means for controlling operation of the assist air supply means in accordance with an operational condition of the engine including at least a temperature of the engine, an operational condition of the swirl control means, and a condition whether the engine is in a range of the lean burn.

2. An internal combustion engine according to claim 1, wherein said control means controls the assist air supply means to conduct an air assisting when the engine temperature is low, irrespective of the operational condition of the swirl control means and of the condition whether the engine is in the range of the lean burn.

3. An internal combustion engine according to claim 1, wherein said control means controls the assist air supply means to conduct an air assisting when the swirl control means is in a non-swirl state, irrespective of a condition in which the engine temperature is low and of the condition whether the engine is in the range of the lean burn.

4. An internal combustion engine according to claim 1, wherein said control means controls the assist air supply means to conduct an air assisting when the engine is not in the range of the lean burn, irrespective of a condition in which the engine temperature is low and of the operational condition of the swirl control means.

* * * * *